United States Patent [19]

Woolnough

[11] Patent Number: 4,657,434
[45] Date of Patent: Apr. 14, 1987

[54] RIVER CONTROL STRUCTURES

[76] Inventor: Anthony L. Woolnough, 6 Lockitt Way, Kingston, Lewes, East Sussex, Great Britain, BN9 3LG

[21] Appl. No.: 732,103
[22] PCT Filed: Aug. 30, 1984
[86] PCT No.: PCT/GB84/00302
§ 371 Date: May 1, 1985
§ 102(e) Date: May 1, 1985
[87] PCT Pub. No.: WO85/01075
PCT Pub. Date: Mar. 14, 1985

[30] Foreign Application Priority Data

Sep. 6, 1983 [GB] United Kingdom ............... 8323837

[51] Int. Cl.⁴ .................................................. E02B 8/08
[52] U.S. Cl. ......................................... 405/81; 405/87; 405/100; 415/148
[58] Field of Search .......... 405/80, 81, 82, 83, 405/87, 101, 102, 103, 106; 43/100, 101; 415/148

[56] References Cited

U.S. PATENT DOCUMENTS

| | | |
|---|---|---|
| 1,036,613 | 8/1912 | Hall ...................................... 405/100 |
| 2,317,975 | 5/1943 | Boath et al. ......................... 405/100 |
| 3,336,756 | 8/1967 | Isenberg et al. .................... 405/100 |

FOREIGN PATENT DOCUMENTS

| | | | |
|---|---|---|---|
| 213341 | 3/1961 | Austria ................................. | 405/100 |
| 756719 | 6/1953 | Fed. Rep. of Germany ...... | 405/100 |
| 800757 | 7/1936 | France ................................. | 405/100 |

Primary Examiner—Cornelius J. Husar
Assistant Examiner—Kristina I. Hall
Attorney, Agent, or Firm—Lynn L. Augspurger

[57] ABSTRACT

This invention relates to river control structures, of the kind known as upstream tilting gates. A structure in accordance with the invention includes a chamber, (1, 2, 3 and 4) and a tilting platform (5). The upstream end of the platform includes a curved transverse wall (10), consisting of a plurality of leaves (12 and 13). When the platform is raised, the leaves provide a continuous wall between the platform and the top of the chamber, while when the platform is lowered, the leaves slide behind each other and are accommodated in the chamber. The structure also includes a channel (7, 8 and 9), extending along the length of the platform. The channel is provided with baffles to limit the flow of water down the channel, to enable fish to surmount the structure.

11 Claims, 1 Drawing Figure

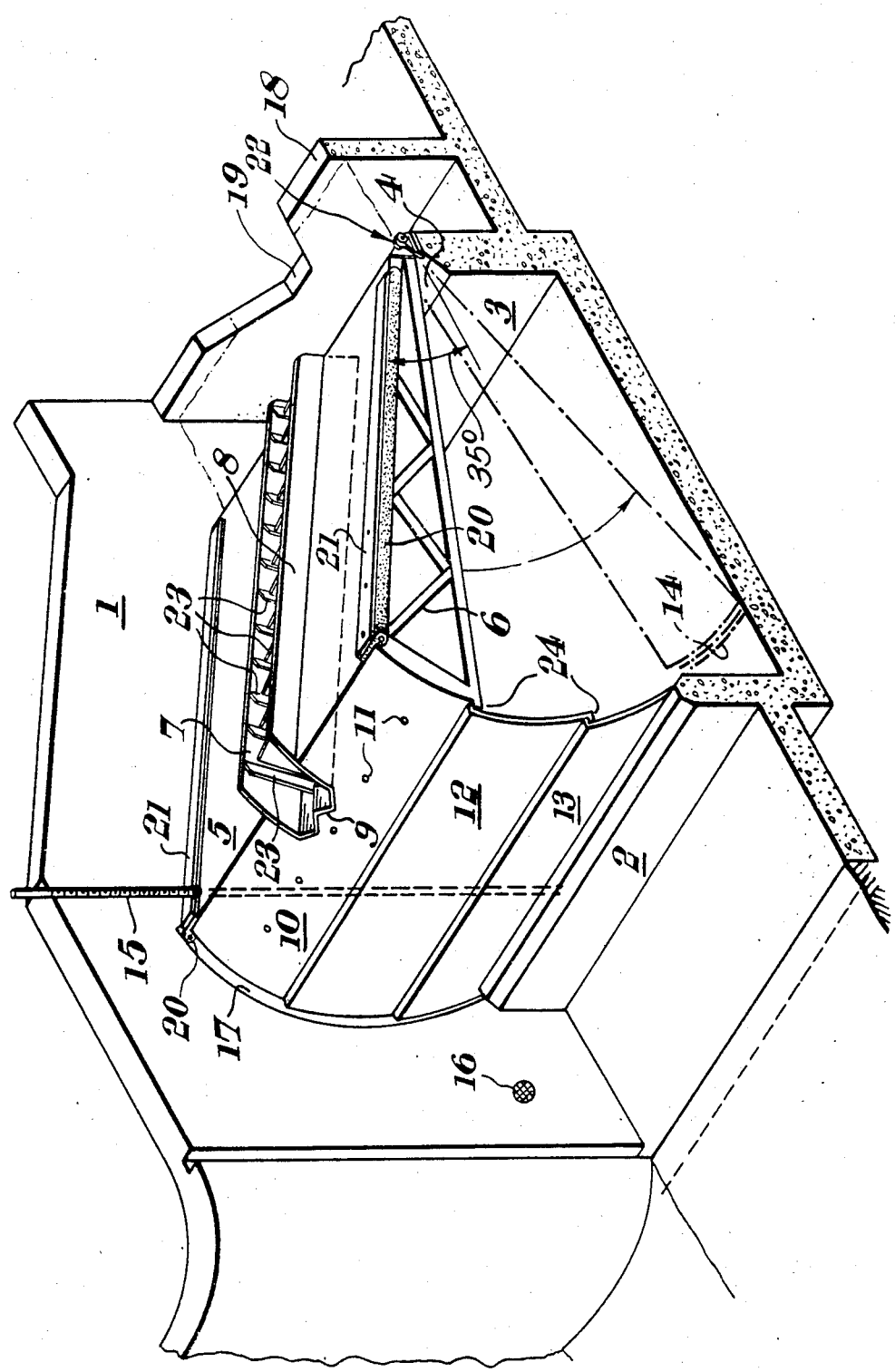

RIVER CONTROL STRUCTURES

This invention relates to river control structures. The term "river" is used herein to include any running stream of water and thus extends, for example, to canals and other watercourses, whether natural or artificial.

It is frequently necessary to provide means for controlling the flow of water, for example to provide water storage. Other uses for river control structures include river flow gauging stations and weirs to retain water for irrigation or extraction for public water supply.

One particular type of structure which has been used for river control is known as an "upstream tilting gate." This type of structure includes a longitudinally extending platform, the downstream end of which is supported with freedom to rotate about an axis extending across the river, and the upstream end of which is supported by control means adapted to raise and lower that end.

Whenever a new control structure is provided on a migratory fish river, it is necessary to provide suitable conditions for migrating fish to surmount the structure en route to their spawning beds in the upper reaches of the river. In the past this has been accomplished by separate fish passes, usually flanking the control structure.

The present invention seeks to provide an economically and biologically more satisfactory solution to the problem of enabling fish to surmount a river control structure.

Accordingly in one aspect of the present invention there is provided a river control structure comprising a chamber having side walls between which a longitudinally extending platform is adapted for orientation across a flowing stream and arranged to pass water across an upper surface of the platform in a flow direction, said platform having an upstream and a downstream end, the downstream end of said platform having mounting means allowing the platform to rotate about a horizontal axis extending transverse to the stream, the upstream end of said platform being supported by control means adapted to raise and lower the upstream end of said platform from a minimum to a maximum height, baffled channel means provided for the upper surface of said platform extending in the flow direction, said baffled channel means having baffles disposed therein and arranged such that, when the upstream end of said platform is raised to its maximum height the permitted water flow through said baffled channel means will allow fish to swim upstream through the baffled channel means.

A considerable study of the jumping and swimming capabilities of fish, and in particular of sea trout and salmonids, has shown that a baffled channel, designed to restrict water flow to 0.85 meters per second, can be safely negotiated by migrating fish. In the case of sea trout, the design provides a factor of safety greater than 2.

It is preferable therefore that the baffles in the channel are so arranged that, even when said upstream end of the said platform is raised to its maximum height, the water flow down said channel means will not exceed 0.85 meters per second.

The channel should be designed in such a way that it will contain the turbulent flow caused by the baffles. For this purpose the sides of the channel should extend above the normal water level. These extended side walls will also serve to confine disorientated fish within the channel. Preferably the channel is located substantially on the longitudinal centre line of the platform and normally it will be convenient for the sides of the channel to extend above the upper surface of the platform to approximately the same extent as they descend below it.

The lower end of the channel is preferably designed in such a way as to produce turbulence, which will attract the migrating fish. In addition, or alternatively, an additional downstream wall may be provided with a notch in the centre of the top of the wall to guide the fish towards the lower end of the channel.

The baffles may be arranged in any way which will restrict the flow to 0.85 meters per second at the maximum inclination required. In particular it has been found that an arrangement known as a "Denil type 19 baffle" will restrict flow to this velocity at an inclination of 35 degrees. In fact it would appear that this type of baffle can normally be used safely up to an inclination of 40 degrees.

The upstream tilting gate, type of control structure is very simple and effective, but it suffers from the disadvantage that material carried downstream by the flowing water collects beneath the platform and eventually prevents the platform from being lowered.

To avoid the problems of blockage and siltation, it has been proposed to provide a depending wall on the upstream edge of the platform. Such a wall is normally in the form of part of a surface of a cylinder, the axis of which is coincident with the axis of rotation of the platform. Such a wall can be designed to prevent material from collecting below the platform, but requires considerable construction work to provide a space below the platform to accommodate the wall as the platform is lowered.

Accordingly it is a further object of the present invention to provide a river control structure according to the first aspect of the invention, but which does not suffer from the disadvantage of known gates.

Thus, according to a second aspect of the invention there is provided a river control structure according to the first aspect of the invention wherein a plurality of depending leaves are provided extending across the width of said platform at the upstream end thereof in such a way that, as said upstream end is lowered towards its lowermost position successive ones of said leaves slide relative to the respective adjacent leaf so as to overlap with their lower edges substantially level in the lowest position of said platform, and whereas as said upstream end of said platform is raised the leaves slide relative to one another to form at least the upper part of a continuous wall across said stream between said upstream end of the platform and the bed of the stream.

Preferably guides are provided in the side walls of the chamber to accommodate the depending leaves. Since the leaves will normally be part-cylindrical, the guides will be arcuate. Preferably seals, possibly made of rubber or a similar material, will be provided between the sides of the platform and the respective side walls. Preferably holes will be provided in at least some of the leaves to enable water to enter the chamber and thus reduce the weight of the platform to be carried by the control means.

A river control structure according to the invention is structure illustrated in the accompanying diagrammatic drawing.

The structure illustrated includes a chamber having two side walls, one of which is broken away in the illustration to show the remaining parts of the structure.

The other side wall is indicated at 1. The chamber also includes an upstream wall 2 and a downstream wall 3. The downstream wall 3 is provided with a ledge 4 on which the platform 5 rests. The platform illustrated includes an upper flat surface and is given the necessary strength by means of a lattice structure indicated at 6.

A channel having side walls 7 and 8 and a base 9 extends from the upstream end to the downstream end of the platform. As can be seen from the drawing, the side walls 7 and 8 extend approximately the same distance above the upper surface of the platform 5 as they extend below it. Baffles 23 of the type known as Denil type 19 baffle are provided in the channel to limit the flow of water down the channel, when the platform is raised to its maximum inclination of 35 degrees, to less than 0.85 meters per second.

The upstream end of the platform includes a curved transverse wall 10. This wall is provided with holes 11 to enable water to enter the interior of the chamber below the platform. Two leaves 12 and 13 depend from the wall 10 which is provided with lip engaging means 24 to allow an upper leaf to raise a lower leaf. The wall 10 and the leaves 12 and 13 run in arcuate channels in the side walls of the chamber, the channel in the side wall 1 being shown at 17. Thus a bottom lip of the wall 10 or leaf 12 engages an upper lip of leaf 12 or 13 respectively drawing it upwardly in channel 17, and allowing it to slide downwardly of its own weight. As can be seen, when the platform is in its raised position, these leaves provide a continuous wall between the platform and the upper edge of the upstream wall 2. When the platform is lowered, the leaves 12 and 13 slide behind the wall 10 and are accommodated in the chamber as indicated by the dashed lines 14.

Control means are provided to raise and lower the upstream end of the platform 5 and these are indicated diagrammatically as a threaded rod 15, which cooperates with a correspondingly threaded nut secured in the platform. Means such as a handle (not shown) are provided to rotate the rod 15 to raise and lower the platform inclination by rotating the platform about hinge 22 which has the horizontal axis extending parallel to the downstream wall 3. Preferably a detector 16 is provided to measure the water level and give a signal, which may be used for automatic control of the inclination of the platform.

The edges of the platform 5 are provided with rubber seals 20 secured to platform 5 by plate 21 which cooperate with the side walls of the chamber.

To assist the migrating fish to find the entrance to the channel, a wall 18 is provided below the downstream wall 3. This wall has a notch 19 designed to produce turbulence which will guide the fish towards the entrance to the channel.

I claim:

1. A river control structure comprising a chamber having side walls between which a longitudinally extending platform is adapted for orientation across a flowing stream and arranged to pass water across an upper surface of the platform in a flow direction, said platform having an upstream and a downstream end,
   the downstream end of said platform having mounting means allowing the platform to rotate about a horizontal axis extending transverse to the stream
   the upstream end or said platform being supported by control means adapted to raise and lower the upstream end of said platform from a minimum to a maximum height,
   baffled channel means provided for the upper surface of said platform extending in the flow direction, said baffled channel means having baffles disposed therein and arranged such that, when the upstream end of said platform is raised to its maximum height the permitted water flow through said baffled channel means will allow fish to swim upstream through the baffled channel means.

2. A river control structure according to claim 1 wherein the baffled channel means has sidewalls which are supported on said platform to extend above the normal water level of said stream such that the baffles of said baffled channel means will cause turbulent flow of water through said channel means and the said channel means contains said turbulent flow caused by said baffles.

3. A river control structure according to claim 1 wherein said baffled channel means is located to allow water to pass therethrough substantially on the longitudinal stream flow center line across the upper surface of said platform.

4. A river control structure according to claim 1 wherein the said baffled channel means has sides which extend above the upper surface of said platform and which also extend below the upper surface of said platform to substantially the same extent to recess the lower sides thereof beneath the upper surface of said platform.

5. A river control structure according to claim 1 wherein there are provided baffle means for producing turbulence at the lower end of the baffle channel means.

6. A river control structure according to claim 1 wherein there is provided as part of said river control structure a transverse downstream wall vertically oriented to traverse the stream of water flowing from said platform and being spaced from the downstream end of said platform, said downstream wall being provided with a notch in the top of said downstream wall to guide the fish towards the downstream end of said baffle channel means.

7. A river control structure according to claim 1 wherein a plurality of depending leaves are provided extending across the width of said platform at the upstream end thereof in such a way that, as said upstream end is lowered towards its lowermost position successive ones of said leaves slide relative to the respective adjacent leaf so as to overlap with their lower edges substantially level in the lowest position of said platform, and whereas as said upstream end of said platform is raised the leaves slide relative to one another to form at least the upper part of a continuous wall across said stream between said upstream end of the platform and the bed of the stream.

8. A river control structure according to claim 7 wherein arcuate guides are provided to accommodate the lateral edges of said depending leaves.

9. A river control structure according to claim 1 wherein apertures are provided in at least some of said depending leaves to enable water to enter beneath the platform and thus reduce the weight of the platform to be carried by the control means.

10. A river control structure according to claim 1 wherein sensing means are provided to monitor stream level and to provide feedback signals adapted to raise or lower the upstream end of said platform to maintain flow of water through said baffle channel means.

11. A river control structure according to claim 1 wherein the baffles are so arranged that, even when said upstream end of said platform is raised to its maximum height, the water flow down and channel means will not exceed 0.85 meters per second.

* * * * *